(12) United States Patent
Albrecht et al.

(10) Patent No.: US 10,424,853 B2
(45) Date of Patent: Sep. 24, 2019

(54) PORTABLE GROUNDING DEVICE

(71) Applicant: Dr. Ing. h.c. F. Porsche Aktiengesellschaft, Stuttgart (DE)

(72) Inventors: Norbert Albrecht, Stuttgart (DE); Björn Abt, Renningen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/978,275

(22) Filed: May 14, 2018

(65) Prior Publication Data
US 2018/0366845 A1   Dec. 20, 2018

(30) Foreign Application Priority Data
Jun. 20, 2017  (DE) .................. 10 2017 113 536

(51) Int. Cl.
*A62C 3/07*     (2006.01)
*H01R 9/24*     (2006.01)
(Continued)

(52) U.S. Cl.
CPC ............. *H01R 9/2483* (2013.01); *A62C 3/07* (2013.01); *B60L 50/50* (2019.02); *H01R 4/66* (2013.01);
(Continued)

(58) Field of Classification Search
CPC ....... H01R 3/00–9/2483; H01R 9/2691; H01R 9/0512; H01R 2201/26; H01R 13/65802;
(Continued)

(56) References Cited

U.S. PATENT DOCUMENTS 2,422,644 A * 6/1947 Martenet .............. G01R 19/155
174/1
3,619,773 A * 11/1971 Lathrop ................. G01R 27/18
174/7
(Continued)

FOREIGN PATENT DOCUMENTS

CN   203218466 U    9/2013
CN   105048230 A    11/2015
(Continued)

OTHER PUBLICATIONS

German Search Report for German Application No. 10 2017 113 536.7, dated Nov. 9, 2017, with partial English translation—7 pages.

*Primary Examiner* — Vanessa Girardi
(74) *Attorney, Agent, or Firm* — RatnerPrestia

(57) ABSTRACT

A method for grounding a hybrid or electric road vehicle which has been involved in an accident, includes making contact with a body of a road vehicle which has been involved in an accident using a first grounding tool, and subsequently grounding a second grounding tool which is connected to the first grounding tool via an electrical line and an apparatus for grounding a hybrid or electric road vehicle which has been involved in an accident. The apparatus has a grounding line, a drive-in tool for being driven into a body of the road vehicle, and a grounding stake for being planted into the ground. The drive-in tool is connected to one end of the grounding line and the grounding stake is connected to the other end of the grounding line.

3 Claims, 1 Drawing Sheet

(51) Int. Cl.
*H01R 9/26* (2006.01)
*H01R 4/66* (2006.01)
*B60L 50/50* (2019.01)

(52) U.S. Cl.
CPC ....... *H01R 9/2691* (2013.01); *H01R 2201/26* (2013.01)

(58) Field of Classification Search
CPC ..... H01R 13/6596; H05K 9/0064; B25F 1/00; A62C 3/07; A62C 3/16; A62B 3/005; G01R 27/18–31/00
See application file for complete search history.

(56) References Cited

U.S. PATENT DOCUMENTS

| | | |
|---|---|---|
| 2007/0283503 A1 | 12/2007 | Ryan |
| 2017/0113080 A1 | 4/2017 | Specht et al. |

FOREIGN PATENT DOCUMENTS

| | | |
|---|---|---|
| DE | 1534507 A1 | 6/1969 |
| DE | 102012201769 A1 | 8/2013 |
| EP | 2760306 A1 | 8/2014 |

\* cited by examiner

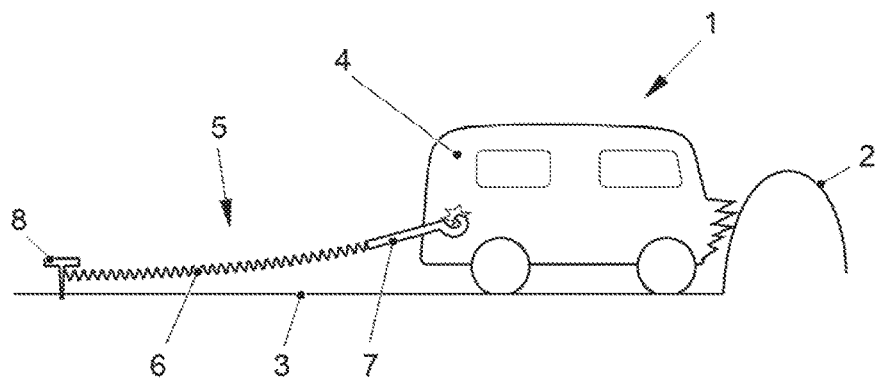

PORTABLE GROUNDING DEVICE

CROSS-REFERENCE TO RELATED APPLICATION

This application claims priority to German Patent Application No. DE 10 2017 113 536.7, filed Jun. 20, 2017, which is incorporated by reference herein in its entirety.

FIELD OF THE INVENTION

The invention relates to a method and an apparatus for grounding a hybrid or electric road vehicle which has been involved in an accident.

BACKGROUND OF THE INVENTION

Hybrid or electric vehicles which are used, in particular, as passenger motor vehicles in road traffic have electrical devices which carry a voltage which is impermissibly high for a person to touch. Said road vehicles contain rechargeable batteries or capacitors for storing large quantities of energy, wherein relatively high voltages, for example of 400 V, are distributed over cable strands, which are laid in cavities in the electrically conductive vehicle body, within the vehicle. If road vehicles of this kind are involved in an accident, the vehicle body may be deformed, with the result that rescue or salvage personnel, with the aid of rescue equipment, have to save people located within the electric vehicle which has been involved in an accident. For this purpose, the rescue or salvage personnel have rescue appliances to which rescue tools are attached, parts of the vehicle body being forced apart or cut open with the aid of said rescue tools. In the event of an accident, an electric vehicle can be severely damaged in such a way that voltage-carrying cable strands which are laid, for example, in a cavity in the vehicle body become separated and come into contact with the vehicle body. A vehicle battery can also be damaged in the event of an accident such that the vehicle body is connected to a voltage-carrying component of the battery. The mechanical devices which form part of a rescue tool, for example salvage cutters or Jaws of Life, are electrically conductive and can therefore transmit a high voltage, which is present across the vehicle body, to the housing of the rescue appliance. In the case of conventional rescue appliances, this constitutes a risk to the salvage or rescue personnel when performing their rescue work on the electric vehicle which has been involved in an accident.

DE 10 2012 201 769 A1, which is incorporated by reference herein, describes a rescue appliance for rescuing a person from an electric vehicle which has been involved in an accident, said rescue appliance having an integrated protective function for protecting salvage personnel against an electric shock. Said rescue appliance has a measuring unit for measuring an electromagnetic field on the electric vehicle which has been involved in the accident when the rescue appliance is placed on the electric vehicle, and furthermore a control unit which deactivates the rescue tool when a measured parameter of the electromagnetic field is in an impermissible region.

EP 2 760 306 A1, which is incorporated by reference herein, describes an electrically insulating salvage glove as a protection means for salvage personnel when performing their salvage work on an electric vehicle which has been involved in an accident.

In the field of trains/streetcars, therefore vehicles which are not road vehicles with steerable wheels on a vehicle axle, which have met with an accident, it is known to throw a metal cable over the overhead line, said metal cable then being fixed into the ground with stakes in order to in this way implement grounding and allow salvage work to be carried out safely.

SUMMARY OF THE INVENTION

Described herein is a method and a device for grounding a hybrid or electric road vehicle which has been involved in an accident. The objective of this method and, respectively, the apparatus is to allow salvage work to be carried out on a vehicle of said kind which has been involved in an accident without delay and without rescue personnel being put at risk.

In the method according to aspects of the invention for grounding a hybrid or electric road vehicle which has been involved in an accident, it is provided that a first grounding tool makes contact with a body of a road vehicle which has been involved in an accident, and a second grounding tool which is connected to the first grounding tool via an electrical line is then grounded.

The first grounding tool is driven, in particular, into the vehicle body or connected to the vehicle body in a clamping manner. The second grounding tool is preferably planted into the ground or connected to a grounded object. This grounded object may be, for example, a traffic sign or a guardrail.

The first grounding tool may be, for example, a carpenter's hammer or roofing hammer or, in another embodiment, a clamp similar to that used in a bridging cable or a grounding cable in a welding appliance. Provision can further be made for the electrical line to be fitted by means of plugs which are connected to one or both line ends, in order to improve or to facilitate handling during grounding.

The second grounding tool can have, when in the form of a grounding stake, different designs, for example in the manner of a grounding rod, a grounding cross, preferably with a directly attached connection lug in each case.

In the apparatus according to aspects of the invention for grounding a hybrid or electric road vehicle which has been involved in an accident, in particular for carrying out the above-described method, it is provided that the apparatus has a grounding line, a drive-in tool for being driven into a body of the road vehicle, and a grounding stake for being planted into the ground, wherein the drive-in tool is connected to one end of the grounding line and the grounding stake is connected to the other end of the grounding line.

Owing to the method according to aspects of the invention and, respectively, the apparatus according to aspects of the invention, it is possible to ensure in a simple and cost-effective manner that a hybrid or electric road vehicle which has met with an accident is reliably grounded before salvage work begins.

The grounding line is preferably in the form of a grounding cable. The drive-in tool is preferably in the form of a lever and/or pressing tool. The drive-in tool is, in particular, a tool which is known by the technical term Halligan tool. A Halligan tool is shown in U.S. Patent App. Pub. No. 20130112045, which is incorporated by reference herein in its entirety. This drive-in tool is used by rescue personnel and has a lever tool and a breaking tool. A drive-in tool or Halligan tool of this kind can be quickly and reliably driven into the body of the road vehicle which has been involved in an accident.

The drive-in tool can be connected to the grounding line by means of a releasable connection. Therefore, a conventional drive-in tool has to be only slightly modified. It can be used as a conventional drive-in tool when it is not connected to the grounding line. If the drive-in tool is intended to be used with a hybrid or electric road vehicle which has been involved in an accident, the drive-in tool is connected to the grounding line. The grounding line can be designed such that it can be connected to the grounding stake. However, it is considered to be particularly advantageous when the grounding line is permanently connected to the grounding stake since the grounding stake as such is not an independent functional component which can be found in connection with rescue work. Rather, the grounding stake is functionally associated with the grounding line. In contrast, the drive-in tool can be used independently for rescue work on a non-electric road vehicle, therefore without being connected to the grounding line.

BRIEF DESCRIPTION OF THE DRAWINGS

The invention is illustrated in the single FIGURE with reference to an exemplary embodiment, without being restricted to said exemplary embodiment.

The FIGURE shows a simplified illustration of a hybrid or electric road vehicle which has been involved in an accident and the apparatus for grounding the vehicle which interacts with the vehicle.

DETAILED DESCRIPTION OF THE INVENTION

The FIGURE shows a hybrid or, electric road vehicle 1 which is a passenger vehicle, for example a van. Said vehicle is involved in an accident, wherein the road vehicle 1 hits an obstacle 2. The vehicle 1 stands on a substrate 3 which is a roadway or directly the ground next to a roadway. An apparatus 5 for grounding the vehicle 1 which has been involved in an accident is used in order to prevent rescue personnel from being injured when rescuing the occupants of the vehicle 1 on account of a body 4 of the vehicle 1 to which an increased voltage is applied. This apparatus 5 has a grounding line 6, a drive-in tool 7 for being driven into the vehicle body 4, and a grounding stake 8 for being planted into the grounding substrate 3, therefore into the ground. The drive-in tool 7 is connected to one end of the grounding line 6, and the grounding stake S is connected to the other end of the grounding line 6. The grounding line 6 is in the form of a grounding cable. The drive-in tool 7 is in the form of a Halligan tool. Therefore, said drive-in tool constitutes a lever and breaking tool which is customarily used by rescue personnel. However, this Halligan tool exhibits the special feature that it is connected to the grounding line 6. However, said Halligan tool is preferably releasably connected to the grounding line 6, so that the drive-in tool can be used independently for rescue work which does not involve electric vehicles. The grounding line 6 is permanently connected to the grounding stake 8.

The grounding stake 8 is preferably provided as a rod with a tapered end which is located at the front in the drive-in direction in order to make it easier to drive in said grounding stake. The grounding stake 8 preferably has a widened portion in the region of its rear end, so that it can be driven into the substrate 3 which is at ground potential by means of a hammer tool in a simple and rapid manner. The grounding line 6 is connected to the grounding stake 8 at the side in the region of the rear end of said grounding stake.

The hybrid or electric road vehicle 1 which has been involved in an accident is grounded by virtue of the drive-in tool 7 first being driven into the body 4 of the road vehicle 1 which has been involved in an accident. The grounding stake 8 which is connected to the drive-in tool 7 via the electrical line, therefore via the grounding line 6, is then grounded.

What is claimed is:

1. A method of using a portable grounding device involving a road vehicle that employs an electrical propulsion system comprising the steps of;
    initially identify a hybrid or electrical vehicle which is potentially a source of errant or stray voltages due to an accident or other such compromise to the electrical propulsion system; and
    establish secure contact between a conductive, readily accessible portion of the road vehicle using a first grounding tool and a second grounding tool located away from the source of errant or stray voltages; where the first grounding tool is in the form of a lever, a breaking tool or a Halligan tool which is driven into the conductive, readily accessible portion of the road vehicle; and
    the second grounding tool is connected to the first grounding tool by an electrical line; thus
    establishing a conductive path to ground for any errant or stray voltages thereby containing potential hazards to human beings.
2. The method as claimed in claim 1, wherein the second grounding tool is driven into the ground.
3. The method as claimed in claim 1, wherein the second grounding tool is connected to a grounded object.

* * * * *